United States Patent [19]
Roberts et al.

[11] Patent Number: 5,987,688
[45] Date of Patent: Nov. 23, 1999

[54] GUM-MASSAGING ORAL BRUSH

[75] Inventors: Michael F. Roberts, Braintree, Mass.; T. Craig Masterman, Foster City, Calif.; Edward Hosung Park, Sharon, Mass.; Philip J. Sweeney, Taunton, Mass.; Mingchih M. Tseng, Hingham, Mass.; Stephen C. Witkus, West Boylston, Mass.

[73] Assignee: Gillette Canada Inc., Kirkland, Canada

[21] Appl. No.: 08/730,286

[22] Filed: Oct. 30, 1996

Related U.S. Application Data

[63] Continuation-in-part of application No. 08/554,931, Nov. 9, 1995, abandoned.

[51] Int. Cl.⁶ .................................. A46B 9/04; A46B 9/06
[52] U.S. Cl. ........................ 15/167.1; 15/110; 15/188; 15/207.2; 15/DIG. 6; 601/141
[58] Field of Search .................... 15/110, 167.1, 15/187, 188, 207.2, DIG. 6; 601/137, 139, 141

[56] References Cited

U.S. PATENT DOCUMENTS

| | | | |
|---|---|---|---|
| Re. 26,688 | 10/1969 | Lemelson | 15/209.1 |
| D. 345,054 | 3/1994 | Spence, Jr. | D4/104 |
| D. 350,851 | 9/1994 | Spence, Jr. | D4/104 |
| 1,251,250 | 12/1917 | Libby | 15/110 |
| 1,924,152 | 8/1933 | Coney et al. | 15/167.1 |
| 2,139,245 | 12/1938 | Ogden | 601/139 |
| 2,328,998 | 9/1943 | Radford | 451/536 |
| 3,016,554 | 1/1962 | Peterson | 15/207.2 |
| 3,258,805 | 7/1966 | Rossnan | 15/110 |
| 3,295,156 | 1/1967 | Brant | 15/167.1 |
| 3,302,230 | 2/1967 | Poppelman | 15/187 X |
| 3,327,339 | 6/1967 | Lemelson | 15/209.1 |
| 3,403,080 | 9/1968 | Lewis, Jr. | 428/376 |
| 3,553,759 | 1/1971 | Kramer et al. | 15/110 |
| 3,613,143 | 10/1971 | Muhler et al. | 15/207.2 X |
| 4,033,008 | 7/1977 | Warren et al. | 15/167.1 |
| 4,263,691 | 4/1981 | Pakarnseree | 15/207.2 |
| 4,288,883 | 9/1981 | Dolinsky | 15/110 |
| 4,356,585 | 11/1982 | Protell et al. | 15/111 |
| 4,403,623 | 9/1983 | Mark | 15/167.1 |
| 4,472,853 | 9/1984 | Rauch | 15/167.1 |
| 4,476,280 | 10/1984 | Poppe et al. | 524/606 |
| 4,585,416 | 4/1986 | DeNiro et al. | 601/139 X |
| 4,603,166 | 7/1986 | Poppe et al. | 524/606 |
| 4,617,342 | 10/1986 | Poppe et al. | 524/606 |
| 4,617,694 | 10/1986 | Bori | 15/167.1 |
| 4,623,495 | 11/1986 | Degoix et al. | 264/1.28 |
| 4,672,706 | 6/1987 | Hill | 15/167.1 |

(List continued on next page.)

FOREIGN PATENT DOCUMENTS

| | | |
|---|---|---|
| 1075171 | 10/1954 | France . |
| 2599361 | 8/1985 | France ................... 15/167.1 |
| 5-123222 | 5/1993 | Japan . |
| 2137080 | 10/1984 | United Kingdom . |
| WO92/04589 | 3/1992 | WIPO . |

OTHER PUBLICATIONS

Plastics Extrusion Technology Handbook, Chapter Seven, Coextrusion and Dual–Extrusion Technology, pp. 168–189.
Modern Plastics Encyclopedia, 67:168–175, 1990.
Pebax 3533 SA 00, "Base Polymer for Structural Hot Melt Adhesives".
Product Literature, Kraton Polymers, pp. 13–21.
Brochure, "Extrusion Lines for the Production of Monofilaments", pp. 2–12, (1989).

*Primary Examiner*—Mark Spisich
*Attorney, Agent, or Firm*—Fish & Richardson P.C.

[57] ABSTRACT

An oral brush is provided that includes an elongated body a head portion extending from the body, and a plurality of bristles, formed of particular thermoplastic elastomers, extending from the body. In various embodiments, the thermoplastic elastomer has a Shore A hardness of at least 30; the thermoplastic elastomer is selected from the group consisting of polyetheramides, polyesters, styrene-ethylene-butylene-styrene block copolymers, polyurethanes, polyolefin elastomers, and mixtures thereof; and the thermoplastic elastomer has a flexural modulus of at least 5 MPa.

2 Claims, 6 Drawing Sheets

U.S. PATENT DOCUMENTS

| | | | |
|---|---|---|---|
| 4,802,255 | 2/1989 | Breuer et al. | 15/207.2 |
| 4,852,202 | 8/1989 | Ledwitz | 15/167.1 |
| 4,882,803 | 11/1989 | Rogers et al. | 15/167.1 |
| 4,894,880 | 1/1990 | Aznavoorian | 15/167.2 |
| 5,021,475 | 6/1991 | Isayev | 524/30 |
| 5,040,260 | 8/1991 | Michaels | 15/188 X |
| 5,114,214 | 5/1992 | Barman | 300/21 |
| 5,291,878 | 3/1994 | Lombardo et al. | 601/139 |
| 5,313,909 | 5/1994 | Tseng et al. | 116/208 |

GUM-MASSAGING ORAL BRUSH

CROSS-REFERENCE TO RELATED APPLICATIONS

This application is a continuation-in-part of U.S. Ser. No. 08/554,931, filed Nov. 9, 1995, abandoned.

BACKGROUND OF THE INVENTION

The invention relates to oral brushes and bristles for use in oral brushes.

Most humans suffer from tooth decay and/or gingivitis caused by bacteria in the mouth. As a result, decreasing the amount of plaque in the mouth has long been the target of persons working in the health care field. A common way of minimizing the plaque in the mouth is to brush the teeth regularly.

However, the benefits of frequent brushing can be accompanied in some instances by deleterious side effects such as irritation, abrasion and even recession of the gums. These side effects may, in part, result from excessive stiffness and/or sharpness of the toothbrush bristles.

Another common way of improving oral health is by massaging the gums to stimulate the gingival tissue. Conventional toothbrushes tend to have limited effectiveness for gum-massaging, and thus often a separate gum-massaging procedure, using a gum-massaging tool, is required to ensure good oral health.

Endeavors have been made to reduce gum irritation and/or provide a gum-massaging effect by replacing some or all of the toothbrush bristles with rubber or synthetic rubber pins. See, e.g., U.S. Pat. No. 4,288,883.

SUMMARY OF THE INVENTION

The invention features improved gum-massaging oral brushes which provide good comfort and gum stimulation while also providing good cleaning of the teeth. The invention also features bristles for use in gum-massaging oral brushes.

In one aspect, the invention features an oral brush including an elongated body, a head portion extending from the body, and a brush portion including a plurality of bristles formed of a thermoplastic elastomer extending from the body. The thermoplastic elastomer preferably has a Shore A hardness of at least 30; is selected from the group consisting of polyetheramides, polyesters, styrene-ethylene-butylene-styrene block copolymers, styrene-butadiene-styrene block copolymers, styrene-isoprene-styrene block copolymers, polyurethanes, polyolefin elastomers, and mixtures thereof; and has a flexural modulus of at least 5 MPa.

Preferred oral brushes further include a plurality of bristles formed of a non-elastomeric material. In preferred embodiments, this material is selected from nylon, polyamides, polyesters and polybutyleneterephthalate (PBT). The non-elastomeric bristles may include additives to improve their cleaning ability, e.g., abrasives and polishing agents such as clays, silicas, aluminas, calcium carbonate, calcium or magnesium phosphate compounds, apatites, and mixtures thereof.

Preferred oral brushes also include a spacer attached to the base of the head portion. The spacer is formed of a thermoplastic elastomer and is integrally joined to the bristles. Preferably the non-elastomeric bristles extend from the head portion through the spacer.

In another aspect, the invention features an oral brush including a plurality of bristles formed of a thermoplastic elastomer, and a plurality of bristles formed of a polyphthalamide.

In another aspect, the invention features massaging the gums with one of the bristles described previously.

An oral brush, as used herein, is any brush that includes a body having a brush portion designed for insertion into the mouth. The brush portion includes a plurality of bristles extending therefrom and being dimensioned to be used to brush tooth surfaces.

In another aspect, the invention features an oral brush including multicomponent bristles, preferably comprising a thermoplastic elastomer sheath surrounding a core material comprising a non-elastomeric material or a thermoplastic elastomer having a higher hardness than the thermoplastic elastomer sheath. The invention also features methods of making multi-component bristles, e.g., by coextruding a plurality of polymers. By "multicomponent", we mean that the bristles have two or more components; by "coextruded", we mean that at least two of the components are present in the form of substantially separate phases having a distinct interface between them, rather than being intermixed. The bristles are preferably formed by processes which are referred to in the art as "coextrusion", but the term "multi-component coextruded", as used herein, encompasses bristles having the structure described above which are manufactured by other processes.

The term "thermoplastic elastomer", as used herein, refers to non-vulcanized, rubbery polymeric materials which may be processed by conventional plastics processing methods which are well known in the art, such as extrusion or injection molding.

In another aspect, the invention features an oral brush including a plurality of bristles formed of a mixture including (a) a non-elastomeric polymer, such as a relatively hard base resin, e.g., Nylon, polypropylene, or polybutylene terephthalate (PBT) and (b) a thermoplastic elastomer such as a polyamide thermoplastic elastomer, a polyester thermoplastic elastomer or other olefinic thermoplastic elastomers. In some embodiments this mixture also contains additives such compatibilizers, abrasives and plasticizers.

In yet another aspect of the invention, the invention features an oral brush including a plurality of bristles formed of a mixture including (a) a non-elastomeric polymer and (b) a soft (e.g., having a hardness of less than 90 Shore A) vulcanized rubber-type polymer, such as natural rubber, crosslinked polybutadiene, crosslinked polyacrylates and the like. In some embodiments this mixture also contains additives such as compatibilizers, abrasives and plasticizers.

Other features and advantages of the invention will be apparent from the description of the preferred embodiment thereof, and from the claims.

DESCRIPTION OF THE PREFERRED EMBODIMENTS

Figure 1:
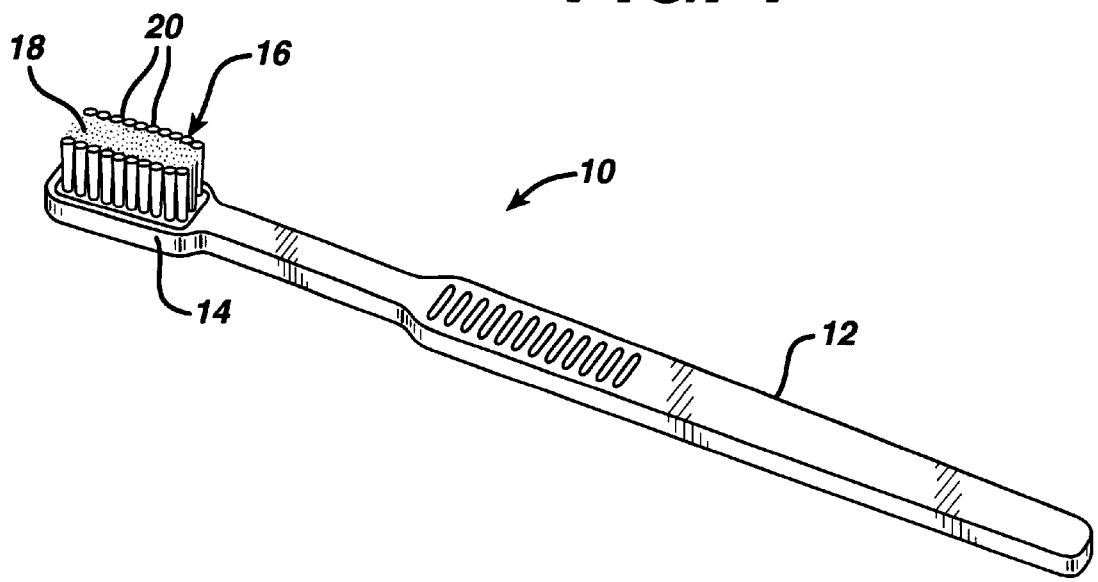
FIG. 1 is a perspective view of a oral brush.

Referring to FIG. 1, a toothbrush 10 includes a plastic body having a handle 12 and a head 14 attached to a bristle portion 16.

The body of the toothbrush is formed by conventional methods well-known in the art. The handle is shaped to be grasped by a hand, but alternatively can be shaped to fit into an electric toothbrush. The configuration of the head can vary and may be rectangular, oval, diamond-shaped, or any other shape, with bristles which are trimmed flat, serrated, v-shaped, convex curved, or any other desired topography, as is well known in the art. The shape and size of handle 12 and head 14 can vary and the axes of the handle and head may be on the same or a different plane. It may be desired to provide a larger head than is conventional, in order to provide extra room for the thermoplastic elastomer bristles, while still retaining the standard number of non-elastomeric bristles.

Figure 2:
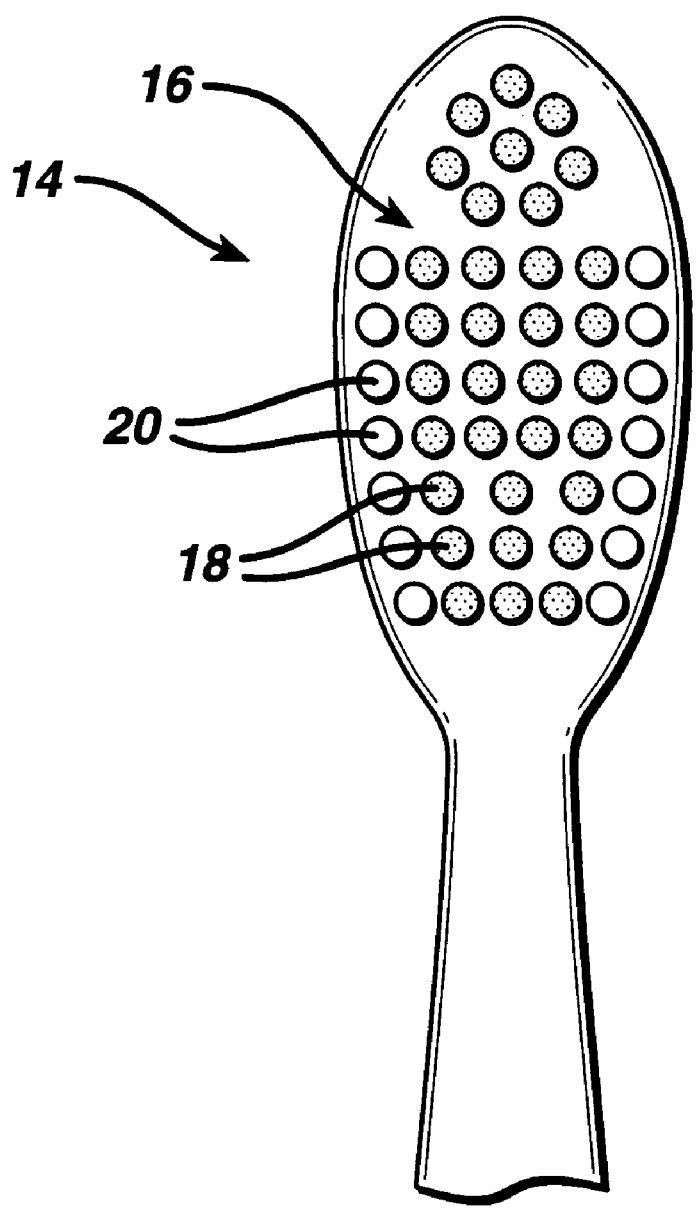
FIG. 2 is a schematic top plan view of the head of an oral brush according to one embodiment of the invention.
Figure 3:
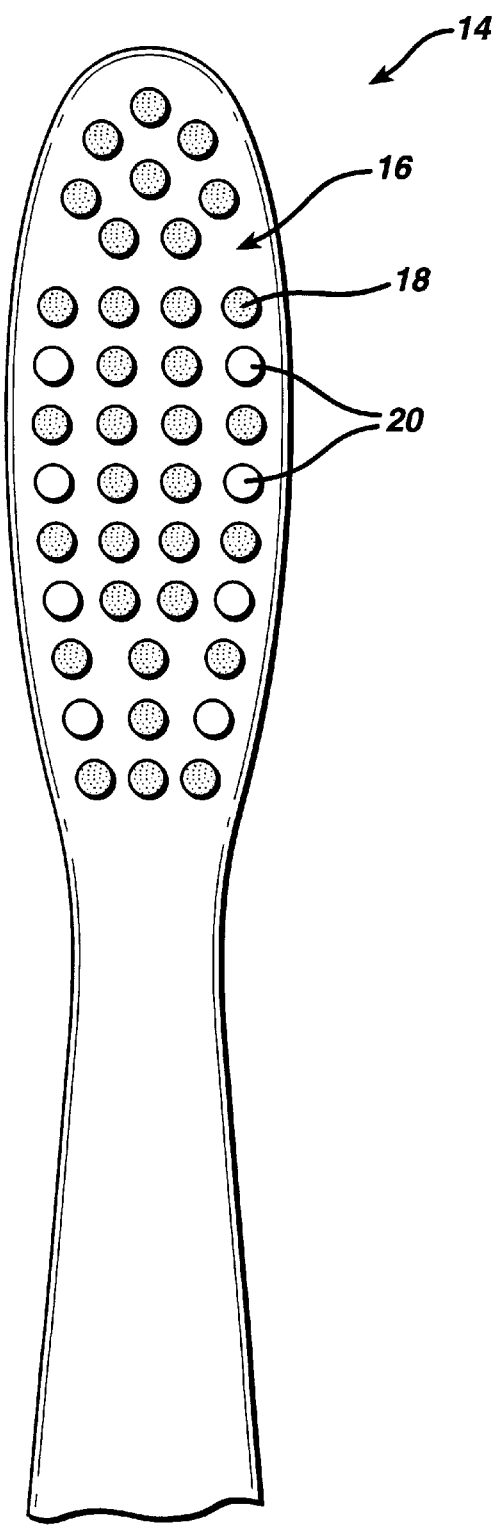
FIG. 3 is a schematic top plan view of the head of an oral brush according to another embodiment of the invention.

Brush portion 16 includes a number of non-elastomeric bristles 18 and a number of elastomeric bristles 20. Preferably, as shown in FIG. 2, the non-elastomeric bristles extend from the central portion of the head 14 and the elastomeric bristles are disposed around the outer perimeter of the head 14, surrounding the non-elastomeric bristles. Another possible arrangement is shown in FIG. 3.

The non-elastomeric bristles are formed of tufts of individual filaments attached to the head in manners known to the art. The elastomeric bristles are formed of tufts of one or more filaments of thermoplastic elastomer. If a single filament is used per tuft, the filament preferably has a diameter that is half that of a standard pre-cored tuft hole, e.g., 33 mil for a 66-mil pre-cored hole, so that the filament can be folded and staple tufted into the hole.

Alternatively, some or all of the bristles are formed of a mixture of elastomeric and non-elastomeric polymers. The elastomeric material is selected from the group consisting of thermoplastic elastomers and vulcanized rubber-type polymers. In both cases, the ratio of the elastomer to the non-elastomeric material is preferably from 10:90–90:10. Preferred bristle diameters range from 3–100 mil (tapered or untapered), depending on the mixture used and elastomer and non-elastomeric material chosen as would be understood by one skilled in the art.

Suitable filaments formed of a blend of elastomeric and non-elastomeric include, but are not limited to the following:

| Composition | Processing Temp | Drawdown Ratio | Diameter | Bend Recovery |
|---|---|---|---|---|
| 30% Pebax 2533 70% Zytel 151L | 250° C. | 4:1 | 8 mil | 95% |
| 30% Pebax 2533 70% Zytel 151L | 250° C. | 4:1 | 7 mil | 95% |

Such a mixture can be compounded using standard processing procedures such as a single screw or twin screw extruder or dry blending.

Suitable thermoplastic elastomers are those which have sufficient stiffness and hardness for effective gum massage and to resist tearing and/or excessive wear during use, while being sufficiently soft to provide comfort and avoid gum irritation during gum massage. Suitable thermoplastic elastomers include polyetheramides, e.g., PEBAX polymers (ELF Atochem); polyesters, e.g., HYTREL polymers (DuPont); styrene-ethylene-butylene-styrene block copolymers, styrene-ethylene-propylene-styrene block copolymers, styrene-butadiene-styrene block copolymers, and styrene-isoprene-styrene block copolymers, e.g., KRATON rubbers (Shell); polyurethanes, e.g., PELLETHANE polyurethanes (DOW); polyolefin elastomers, e.g., SANTOPRENE elastomers (Advanced Elastomer Systems); and mixtures thereof. Poly(ether-amide) block copolymers having the general formula

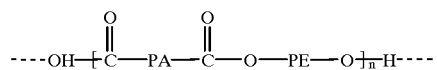

where PA=polyamide segment and PE=polyether segment, commercially available under the tradename PEBAX polymers, are particularly preferred. Of these, a copolymer of nylon 12 and poly(tetramethylene glycol) commercially available under the tradename PEBAX MX-1205 polymer is particularly preferred. Another preferred thermoplastic elastomer comprises a blend of a polyamide sold under the tradename PEBAX 2533 and a block copolymer sold under the tradename KRATON G-6713, preferably containing about 90% of the polyamide and 10% of the block copolymer. This blend provides good softness without tackiness or weakness.

If a relatively soft thermoplastic elastomer is used, a relatively large diameter filament may be needed to provide sufficient durability and stiffness. Such large diameter filaments preferably have a diameter less than about 200 mil, more preferably 30 to 100 mil. If a harder, stiffer thermoplastic elastomer is used, a smaller diameter filament can be used. Generally, suitable thermoplastic elastomers will have a Shore A hardness of at least 30, preferably from about 35 to 55 and a flexural modulus of from about 5 to 100 MPa.

Suitable vulcanized rubber type polymers include, but are not limited to, natural rubber, crosslinked polybutadiene, cross-linked polyacrylates, and blends thereof.

Non-elastomeric bristles 18 may be formed of any material suitable for use in toothbrush bristles. Such materials can also be used as the non-elastomeric component of elastomeric non-elastomeric blend bristles. Preferred materials include nylon 612 and other polyamides. A preferred grade of nylon is available from Whiting Co., Burlington, Vt. under the tradename WYTEX. Preferred polyamides include polythalamides sold by Amoco Performance Products, Inc., under the tradename AMODEL resins. Such polyphthalamides are described in U.S. Pat. Nos. 4,603,166, 4,476,280, and 4,617,342, the disclosures of which are incorporated herein by reference. A particularly preferred polyphthalamide is a crystalline polyphthalamide formed by polymerization of terphthalic acid, isophthalic acid and adipic acid with hexamethylene diamine. Other suitable filaments include acetal resins, polyesters, fluoropolymers, polyacrylates, polysulfones and combinations thereof. Preferred non-elastomeric filaments have a diameter of from about 3 to 10 mil.

Figure 4:
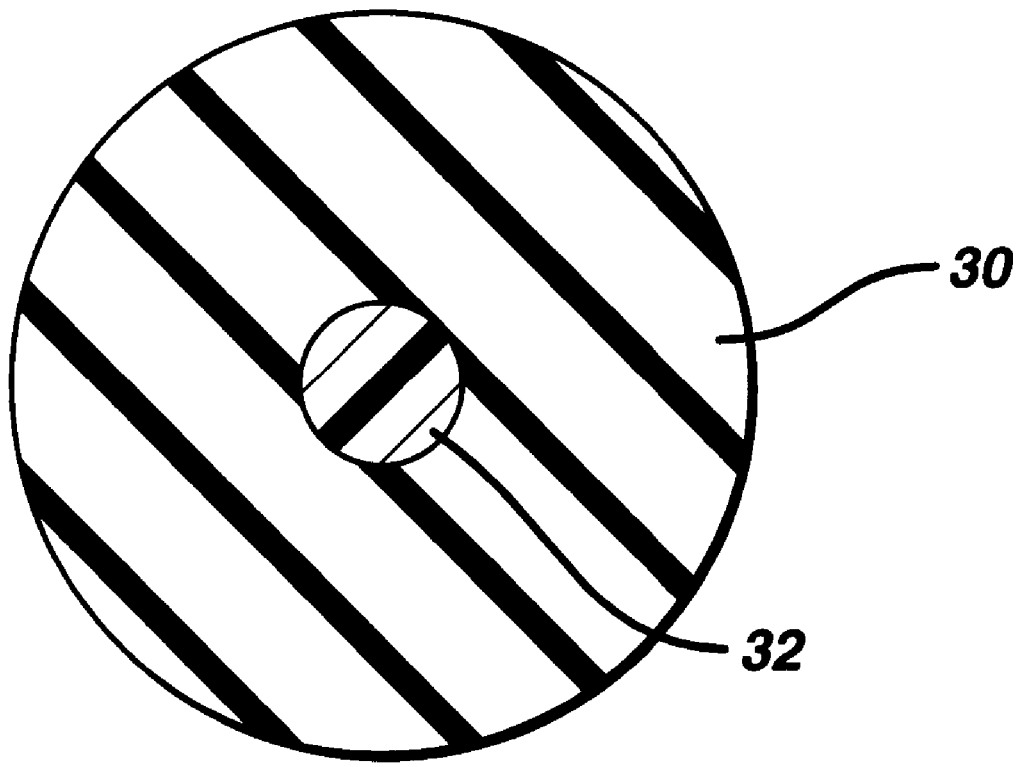
FIG. 4 is a cross-sectional top view of a co-extruded bristle according to one embodiment of the invention.

In an alternate embodiment, the elastomeric bristles include a sheath 30 of thermoplastic elastomer coextruded around a core 32 of a different material, as shown in cross-section in FIG. 4. The sheath to core volume ratio may be from 95:5 to 5:95.

Preferably, the core material is a stiff polymer, allowing the outer sheath to be softer and/or allowing the bristles to have smaller diameters than would otherwise be possible (with a thermoplastic elastomer alone) due to the constraints of bristle durability and strength. If desired the coextruded filaments can have standard bristle diameters, e.g., 5–8 mil. Preferred filament diameters range from 5 to 65 mil, depending on the application in which the bristle is to be used. Suitable core materials include but are not limited to polyamides, e.g., nylons, and polyesters, e.g., PBT.

Preferred sheath materials include the thermoplastic elastomers discussed above. Softer grades of these elastomers can be used when a stiff core is provided, e.g., the sheath material may have a hardness as low as 3 Shore A.

Figure 5:
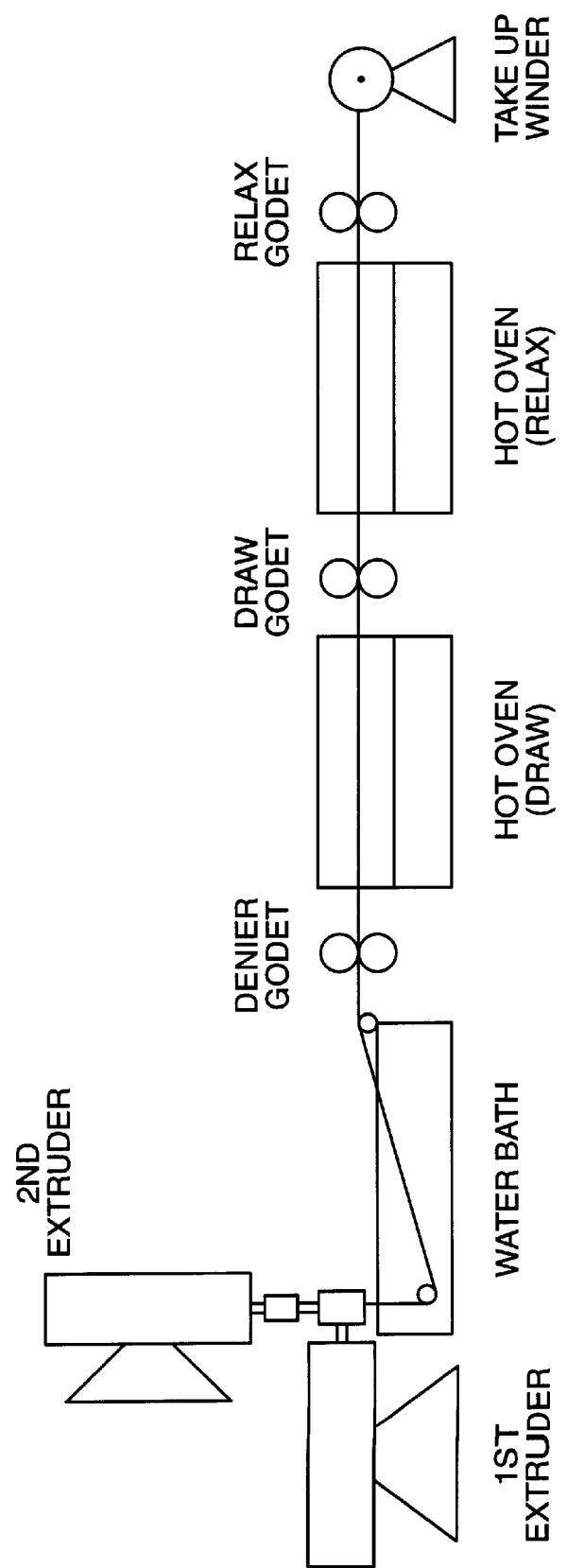
FIG. 5 is a schematic diagram showing a process according to one embodiment of the invention for forming a coextruded filament.

A suitable method for forming the coextruded filaments is shown in FIG. 5. As shown, the two components are extruded through first and second extruders to form a filament, after which the filament is passed through a water bath, and through a series of godets. The filament is placed under light tension as it travels between two drawing godets which are rotating at different speeds. The tension applied to the filament is expressed as the "drawdown ratio", which is the speed differential between the two drawing godets. Preferred drawdown ratios are from about 1.0 to 7.0. The filament then passes through a relaxing godet and is collected on a take-up winder. Suitable coextruded filaments include, but are not limited to, the following:

| Composition (Sheath/Core) | Volume Ratio | Drawdown Rat. | Diameter |
| --- | --- | --- | --- |
| PEBAX MX1205/ Nylon 612 | 10:90 | 4:1 | 8 mil |
| PEBAX MX1205/ Nylon 612 | 50:50 | 1:1 or 2:1 | 55 mil |
| Blend of 90% PEBAX 2533 and 10% DYNAFLEX G6712/ Nylon 612 | 10:90 or 50:50 | 4:1 1:1 or 2:1 | 8 mil 55 mil |
| HYTREL 3078/ Nylon 612 | 10:90 or 50:50 | 4:1 1:1 or 2:1 | 8 mil 55 mil |

Figure 6:
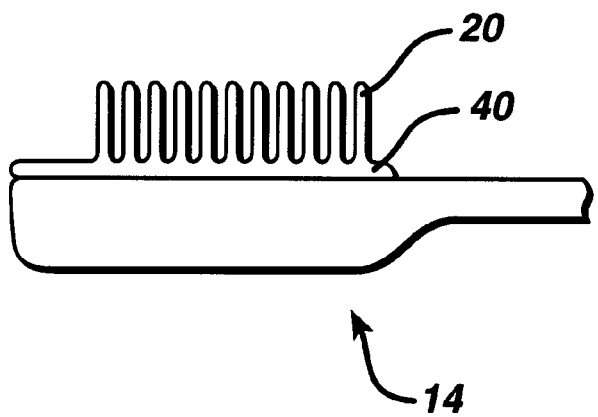
FIGS. 6 and 7 are perspective views of oral brushes having bristles molded to a spacer.

In an alternate embodiment, head portion 14 includes bristles 20 integrally joined to spacer 40, which is attached to the base of head portion 14, as shown in FIG. 6. Spacer 40 provides good adhesion of bristles 20 to head portion 14 and provides support to bristles 18. The additional support provided by spacer 40 stiffens bristles 18 by decreasing the effective length of the bristles, which allows the incorporation of bristles having smaller diameters that more easily penetrate the interstitial regions of the mouth into the toothbrush. Bristles 18 extend from head portion 14 through spacer 40. Spacer 40 is formed of the elastomeric materials listed above and can be formed of the same elastomeric material as used to form the elastomeric bristles 20. Spacer 40 and elastomeric bristles 20 at the perimeter of head portion 14 can be molded as one unit. If the bristles 20 and spacer 40 are molded as one unit, their diameter is preferably from about 4 mil to about 200 mil. Elastomeric bristles 20 can extend at angles from spacer 40.

Figure 7:
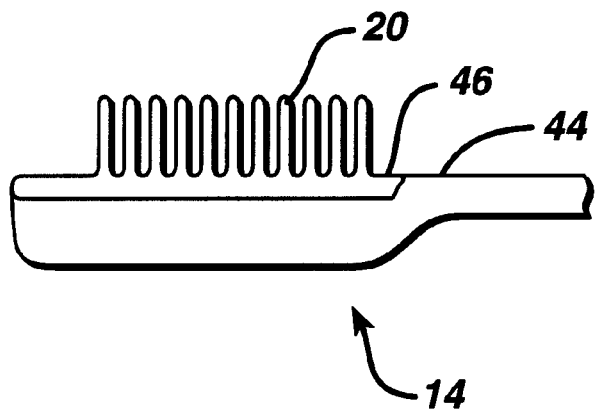

Alternatively, spacer 40 can be recessed into head 14 such that the bristle receiving surface 46 of spacer 40 is substantially contiguous with surface 44 of head portion 14, as shown in FIG. 7.

Other embodiments are within the claims. For example, if desired, all of the bristles may be formed of thermoplastic elastomer material. The bristles may be formed of a blend of thermoplastic elastomers. Moreover, the oral brush may include elastomeric bristles having different relative compositions, e.g., some of the bristles are formed of a first thermoplastic elastomer or blend of elastomers and other bristles are formed of a different thermoplastic elastomer or blend. Further, the elastomeric bristles may include other polymers, e.g., plasticizers such as oils, waxes or resins to increase softness, or additives, e.g., fillers, antioxidants, UV stabilizers, and abrasives or polishing agents. Suitable polishing agents include particles of plastic, particles of walnut shells, particles of hardwood, particles of corn cob, particles of rubber, calcium carbonate, aragonite clay, orthorhombic clays, calcite clay, rhombohedral clays, kaolin clay, bentonite clay, dicalcium phosphate, dicalcium phosphate anhydrous, dicalcium phosphate dihydrate, tricalcium phosphate, calcium pyrophosphate, insoluble sodium metaphosphate, precipitated calcium carbonate, magnesium orthophosphate, trimagnesium phosphate, hydroxyapatites, synthetic apatites, alumina, hydrated alumina, hydrated silica xerogel, metal aluminosilicate complexes, sodium aluminum silicates, zirconium silicate, silicon dioxide, and combinations thereof.

We claim:

1. An oral brush comprising:

an elongated body;

a head portion extending from said body; and a brush portion comprising a plurality of bristles extending from said head portion, said bristles comprising a thermoplastic elastomer sheath surrounding a core comprising a thermoplastic elastomer having a higher hardness than said thermoplastic elastomer sheath.

2. The oral brush of claim 1, wherein said sheath comprises a thermoplastic elastomer selected from the group consisting of polyetheramides, polyesters, styrene-ethylene-butylene-styrene block copolymers, styrene-butadiene-styrene block copolymers, styrene-isoprene-styrene block copolymers, polyurethanes, polyolefin elastomers, and mixtures thereof.

\* \* \* \* \*